United States Patent
Kawahara

(10) Patent No.: US 7,254,817 B2
(45) Date of Patent: Aug. 7, 2007

(54) APPARATUS AND METHODS FOR INTEGRATING APIS FOR PROGRAM EXECUTION MANAGEMENT

(75) Inventor: Hideya Kawahara, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 685 days.

(21) Appl. No.: 10/003,920

(22) Filed: Oct. 31, 2001

(65) Prior Publication Data

US 2003/0084202 A1 May 1, 2003

(51) Int. Cl.
*G06F 9/445* (2006.01)
*G06F 9/54* (2006.01)
(52) U.S. Cl. ...................... 719/328; 719/330
(58) Field of Classification Search ............... 719/313, 719/328, 330; 718/1
See application file for complete search history.

(56) References Cited

U.S. PATENT DOCUMENTS

| | | | |
|---|---|---|---|
| 6,175,877 B1 * | 1/2001 | Zerber | 719/310 |
| 6,438,744 B2 * | 8/2002 | Toutonghi et al. | 717/137 |
| 6,510,550 B1 * | 1/2003 | Hightower et al. | 717/108 |
| 6,529,962 B1 * | 3/2003 | Azagury et al. | 719/330 |
| 6,539,422 B1 * | 3/2003 | Hunt et al. | 709/217 |
| 6,571,252 B1 * | 5/2003 | Mukherjee | 707/10 |
| 6,587,888 B1 * | 7/2003 | Chieu et al. | 719/313 |
| 6,609,158 B1 * | 8/2003 | Nevarez et al. | 719/316 |
| 6,704,805 B1 * | 3/2004 | Acker et al. | 719/315 |
| 6,836,889 B1 * | 12/2004 | Chan et al. | 719/310 |
| 6,944,680 B1 * | 9/2005 | Lee et al. | 709/249 |

OTHER PUBLICATIONS

Neeran M. Karnik and Anand R. Tripathi, "Security in the Ajanta Mobile Agent System," May 1999, pp. 1-28.*
"Class java.lang.Runtime", http://java.sun.com/products/jdk/1-1/docs/api/java.lang.Runtime.html 8 pages, 1999.
"Class java.lang.Process", http://java.sun.com/products/jdk/1-1/docs/api/java.lang.Process.html, 3 pages, 1999.
"Class java.applet.Applet", http://java.sun.com/products/jdk/1-1/docs/api/java.applet.Applet.html, 9 pages, 1999.
Balfanz, et al, "Experience with Secure Multi-Processing in Java", IEEE, 1998, 8 pages.
"Java Remote Method Invocation-Distributed Computing for Java" Sun Microsystems, Inc., 1995, 23 pages.
"Class java.lang.Runtime", java.sun.com/products/jdk/1-1/docs/api/java.lang.Runtime.html, 4 pages.

(Continued)

*Primary Examiner*—Meng-Al T. An
*Assistant Examiner*—Li Zhen
(74) *Attorney, Agent, or Firm*—Dorsey & Whitney LLP

(57) ABSTRACT

Disclosed are apparatus and methods for controlling execution of a target software component within an isolated execution unit. In general terms, an intermediary software component is introduced within the isolated execution unit. This intermediary component program can initialize the isolated execution unit, and then start a target software component within the isolated execution unit. The intermediary component also establishes communication back to the parent (e.g., using an inter isolation communication). The intermediary component communicates with the target software component using the target component's unchanged API and mediates the communication back to the parent using the established inter isolation communication.

29 Claims, 6 Drawing Sheets

OTHER PUBLICATIONS

"Class java.lang.Process", java.sun.com/products/jdk/1-1/docs/api/java.lang.Process.html, 2 pages.

"Class java.applet.Applet", java.sun.com/products/jdk/1-1/docs/api/java.applet.Applet.html, 5 pages.

Balfanz, et al, "Experience with Secure Multi-Processing in Java", IEEE, 1998, 4 pages.

"Java Remote Method Invocation-Distributed Computing for Java" Sun Microsystems, Inc., 1995, 12 pages.

* cited by examiner

APPARATUS AND METHODS FOR INTEGRATING APIS FOR PROGRAM EXECUTION MANAGEMENT

BACKGROUND OF THE INVENTION

The invention relates generally to software applications and, more particularly, to methods and apparatus for controlling execution of a software component that resides within an isolated execution unit.

In many software applications, there is a need for isolated execution units. An isolated execution unit generally does not share its states with other software modules which are not a part of the isolated execution unit. Conventionally, a software module that does not reside within an isolated execution unit cannot communicate with other software modules that do reside in the isolated execution unit. For example, an isolated execution unit does not share memory with another software module that does not reside within the isolated execution unit. Since isolated execution units do not share states, a particular isolated execution unit is protected from an erroneous behavior running in another isolated execution unit. Examples of isolated execution units include a "process" in a Unix operating system or a Logical Virtual Machine on a Java platform.

Each isolated execution unit may also create one or more internal software components. For example, a isolated execution unit may take the form of a browser application that spawns a software component in the form of an applet. Several different software component models have been proposed, including Java applet, Java Xlet and Java servlet. Those software component models typically have unique APIs (Application Programming Interfaces) that are different from each other.

There are some cases where it is better to locate and execute these software components in different isolated execution units than the one that creates them in order to isolate erroneous behavior. For example, a web browser spawns an isolated execution unit; it instantiates a new applet in it; then the web browser starts the execution of the applet. However, there are several difficulties to practicing this scheme. FIG. 1 is a diagrammatic representation of a typical isolated execution unit setup. As shown, a isolated execution unit 102 includes an internal software component 104. The isolated execution unit has API 108, and the software component 104 has API 110 that may differ from the isolated execution unit's API 108. A parent program 106 communicates with the isolated execution unit 102 through the API 108 of the isolated execution unit 102. However, the parent program 106 cannot communicate with the software component 104 since the software component's API 110 is not accessible by the parent program 106. That is, the software component's API 110 is "isolated" from the parent program 106.

Since the parent program 106 cannot communicate with the software component, the parent program 106 cannot access API 110 of the software component 104. The parent program may need to access the API 110 to control the software component for any number of reasons. In one example, the isolated execution unit 102 represents a web browser and the software component 104 is an applet. If the applet 104 misbehaves, it is desirable to shut down the applet. However, in this setup the applet can only be terminated by shutting down the entire browser 102. That is, the browser 102 is needlessly shut down. Of course, shutting down the browser is typically very undesirable. In another example, the parent program cannot initialize the state of the isolated execution unit before execution of the software component to a desired state. For example, this initialization may include assigning initial values to execution environment variables.

A conventional technique for solving this problem is to provide multiple APIs within the isolated execution unit for each kind of software component within the isolated execution unit. FIG. 2 is a diagrammatic representation of a communication mechanism, where an isolated execution unit 202 has been modified to expose an internal component's API. As shown, the isolated execution unit 202 includes API 208 for software component 204. A parent program 206 may then communicate with software component 204 through the exposed API 208.

This approach has several associated disadvantages. Since an API must be created for each software component, a significant number of API's may have to be created. Additionally, modification of an isolated execution unit is not desirable. One reason is that modification of the isolated execution unit can be rather complex and time consuming. Also, modification of the isolated execution unit for each software component cancels out the advantages of using software components in the first place, e.g., the ability to simply use software components "as is" without modification.

Accordingly, there is a need for improved mechanisms for controlling or monitoring execution of a software component that is associated with an isolated execution unit.

SUMMARY OF THE INVENTION

Broadly speaking, the present invention fills these needs by providing apparatus and methods for controlling or monitoring execution of a target software component within an isolated execution unit. In general terms, an intermediary software component is introduced within the isolated execution unit. In order to communicate back to the parent program, an inter isolation communication mechanism may be used. In that case, the intermediary software component may be designed or modified to perform initialization of such a communication mechanism and use the communication mechanism to communicate with the parent. This intermediary component program can initialize the isolated execution unit, and then start a target software component within the isolated execution unit. That is, the intermediary component establishes a communication path back to the parent (e.g., using an inter isolation communication). The intermediary component may then communicate with the target software component using the target component's unchanged API and mediates the communication back to the parent using the established communication path.

In one embodiment, a method for controlling or monitoring a target software component of an isolated execution unit is disclosed. An intermediary software component is introduced within an isolated execution unit. An identifier of a target software component is indicated to the intermediary software component. The target software component having the indicated identifier is initiated within the isolated execution unit. A communication path is established between the intermediary software component and an external program that is outside of the isolated execution unit whereby the external program can control or monitor the target software component via the established communication path.

In a further implementation, the identifier of the target software component is provided by the external program. Preferably, the established communication path uses an inter isolation communication protocol. For example, the inter isolation communication protocol is a remote method invocation technique. Additionally, the communication path is established by the intermediary software component. In one implementation, the isolated execution unit is initialized by the intermediary software component. In a further implementation, one or more parameters for initializing the isolated execution unit may be indicated by the external program to the intermediary software component. The initialization of the isolated execution unit is based on the indicated one or more parameters.

In a further aspect, an execution control parameter is indicated to the intermediary software component and the indicated execution control parameter is invoked on the target software component using an application programming interface (API) of the target software component. Additionally, the execution control parameter is a request that has a first format of an inter isolation communication protocol. The intermediary software component translates the first format into a second format that is acceptable by the API of the target software component.

In another implementation, the intermediary software component receives a result from the target component in response to the invoked execution control parameter and sends the result to the external program. The result has a first format that is acceptable by the API of the target software component. The intermediary software component translates the first format into a second format that is an inter isolation communication protocol before sending the result to the external program.

In another aspect, the invention pertains to a computer implemented system operable to control or monitor a target software component of an isolated execution unit. The computer system includes an isolated execution unit, an intermediary software component within the isolated execution unit, and an external program that is outside of the isolated execution unit. The external program is configured to indicate an identifier of a target software component to the intermediary software component. The intermediary software component is configured to start the target software component having the indicated identifier within the isolated execution unit and establish a communication path between the intermediary software component and the external program whereby the external program can control the target software component via the established communication path. The components of the computer implemented system are further adapted to provide one or more of the above described methods. In another embodiment, the invention pertains to a computer readable medium having instructions for controlling or monitoring a target software component of an isolated execution unit. The computer readable medium includes computer code for performing the above described methods.

Advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings.

DETAILED DESCRIPTION OF THE EMBODIMENTS

Reference will now be made in detail to specific embodiments of the invention. While the invention will be described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
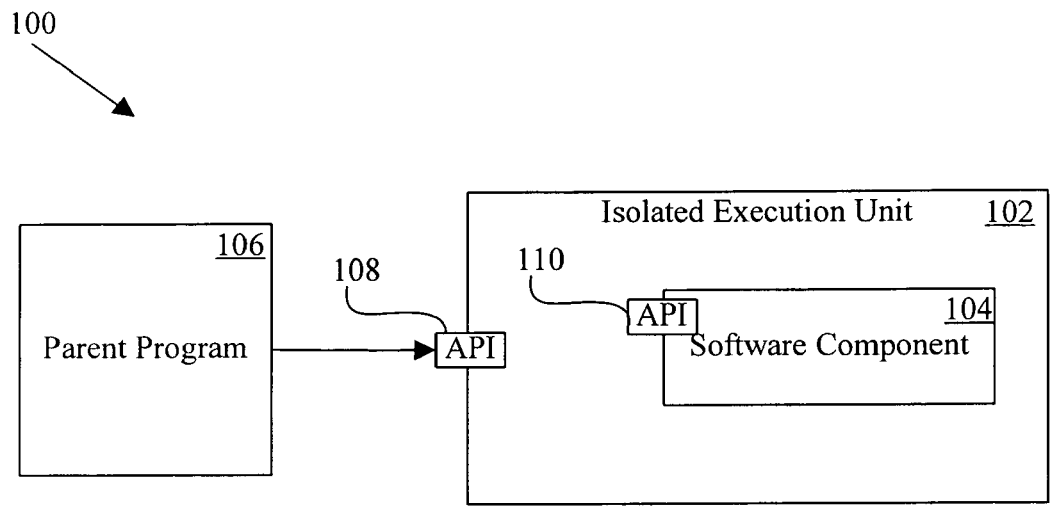
FIG. 1 is a diagrammatic representation of a typical isolated execution unit setup.
Figure 2:
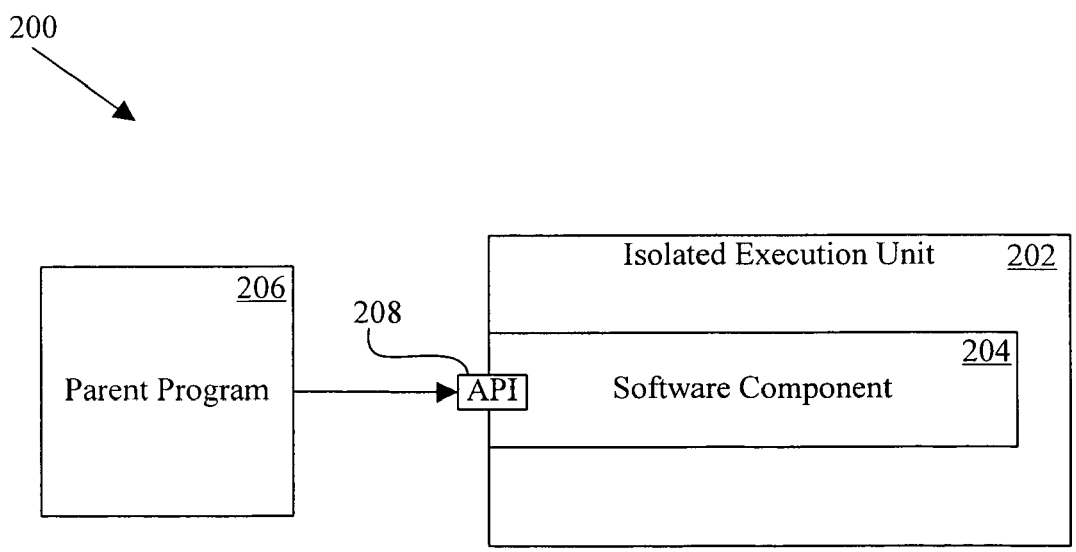
FIG. 2 is a diagrammatic representation of a communication mechanism, where an isolated execution unit has been modified to expose an internal component's API.
Figure 3:
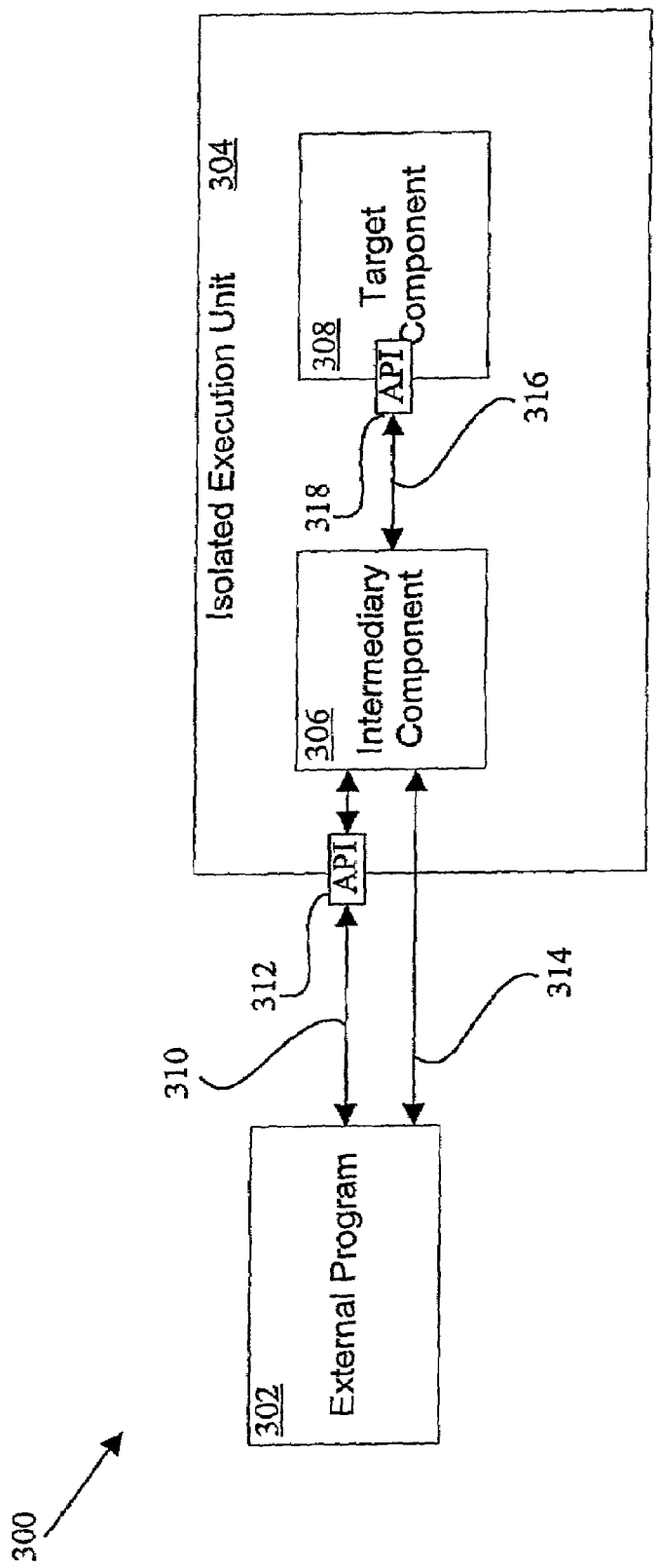
FIG. 3 is a diagrammatic representation of a communication mechanism for controlling execution of a target software component of an isolated execution unit in accordance with one embodiment of the present invention.

FIG. 3 is a diagrammatic representation of a communication mechanism 300 for controlling execution of a target software component of an isolated execution unit in accordance with one embodiment of the present invention. In general terms, an external program 302 sets up an intermediary component 306 within an isolated execution unit 304 (e.g., the intermediary component becomes a part of the isolated execution unit). In the illustrated embodiment, the external program is a parent program of the isolated execution unit. However, the execution unit may have been created by another external program or parent program. The intermediary component 306 then sets up a communication path 314 to the external program 302. The external program 302 may then make a request through path 314 to the intermediary component 306. The intermediary component 306 then translates the request and sends it to a target component 308 through communication path 316 and the target component's API 318. Results in response to the request may also be sent from the target component 308, translated by the intermediary component 306, and sent to the external program 302 through communication path 316. In sum, the intermediary component 306 communicates with the external program via the established path 314 and communicates with the target component 308 through the target's own API 318.

Figure 4:
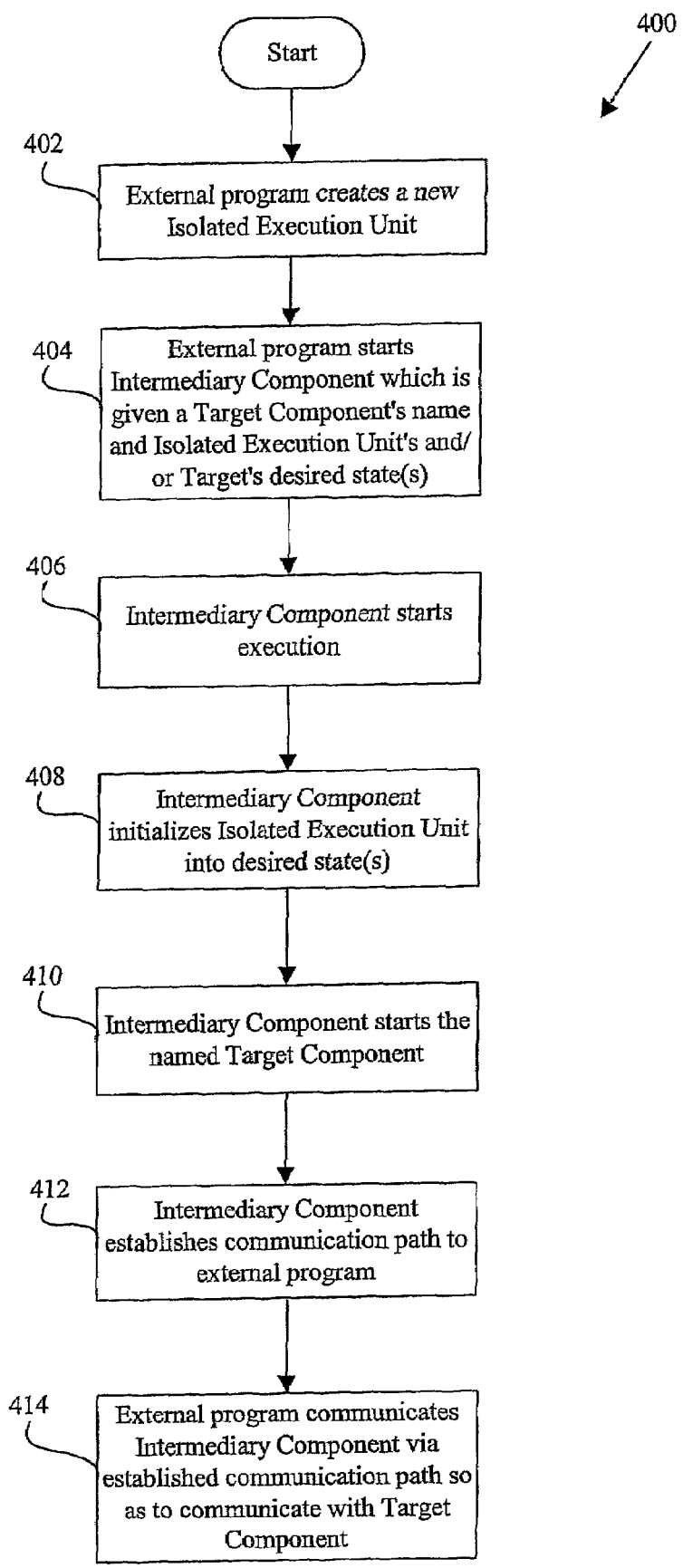
FIG. 4 is a flowchart illustrating a procedure for communicating with a target component of an isolated execution unit in accordance with one embodiment of the present invention.

FIG. 4 is a flowchart illustrating a procedure 400 for communicating with a target component of an isolated execution unit in accordance with one embodiment of the present invention. Of course, the procedure of FIG. 4 may be applied to multiple components within a same or different isolated execution unit. Initially, an external program may create a new isolated execution unit in operation 402. Alternatively, the isolated execution unit may already have been created by another external program. The external program then starts an intermediary component within the new isolated execution unit that is given a target components name and one or more desired state(s) for the isolated execution unit and/or target component in operation 404.

The intermediary component then starts execution in operation 406. The intermediary component then initializes the isolated execution unit into the one or more desired state(s) supplied by the external program in operation 408. The intermediary component also starts the name target component in operation 410. The target component may also be initialized into one more desired states previously supplied by the external program. The states may include any configurable state. For example, a particular variable may be set, which may include setting the current working directory, the maximum number of file descriptors that the isolated execution unit can use, a name of input data file, etc.

Additionally, the intermediary component establishes a communication path to the external program in operation 412. The external program may then communicate with the intermediary component via the established communication path so as to communicate with the target component in operation 414. This communication may be in any suitable form for controlling or monitoring execution of the target component. For example, the external program may make a method request to the target component via the established communication path.

Figure 5:
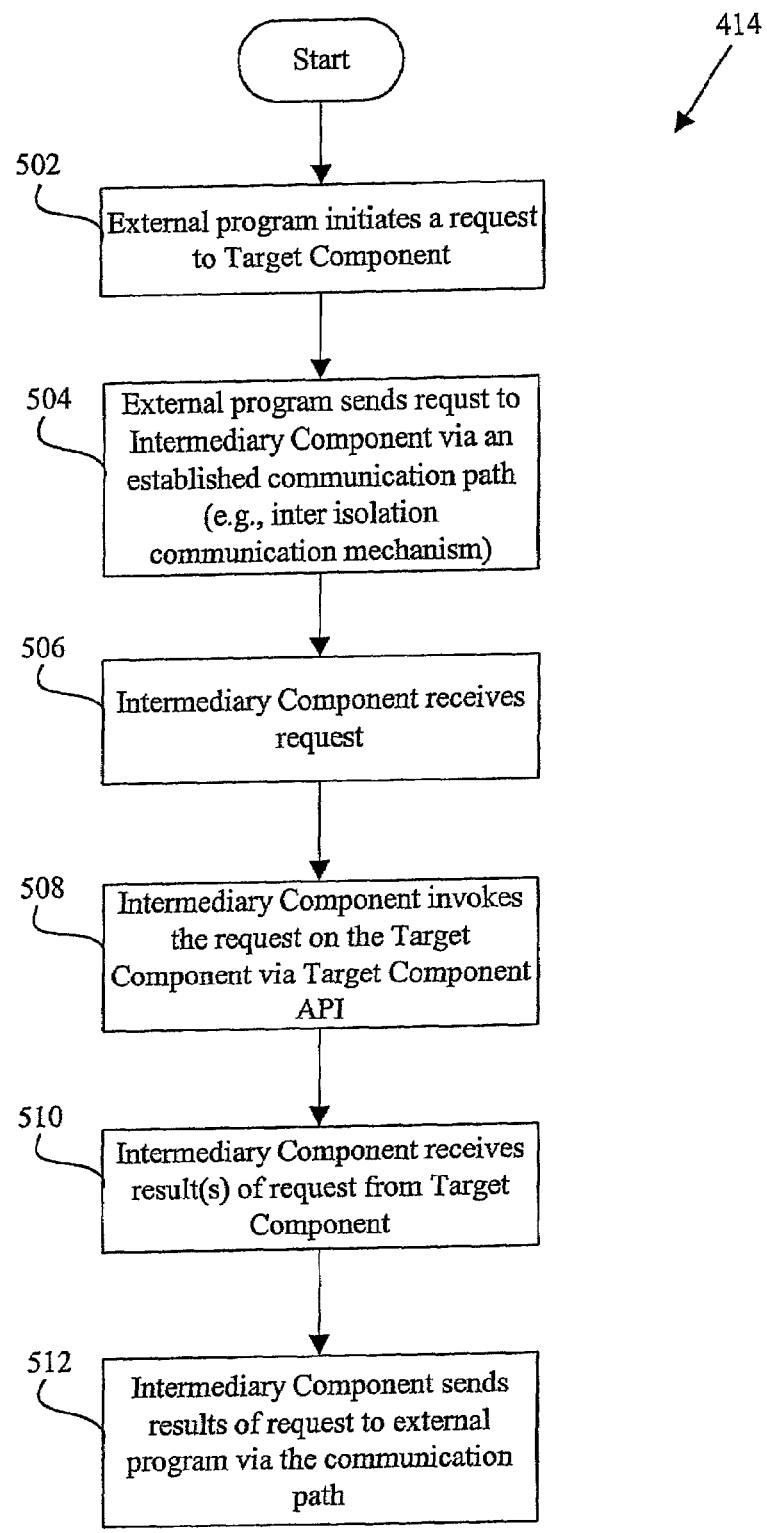
FIG. 5 is a flowchart illustrating the operation of FIG. 4 of communicating between the parent program and the target component in accordance with one embodiment of the present invention.

FIG. 5 is a flowchart illustrating the operation 414 of FIG. 4 of communicating between the external program and the target component in accordance with one embodiment of the present invention. The illustrated operation 414 of FIG. 5 merely represents an example communication sequence between an external program and a target component of an isolated execution unit. Of course, there are numerous forms that such a communication could take. In the illustrated embodiment, the external program initiates a control parameter or request to be sent to the target component in operation 502. The request is in a form for communicating through the established communication path. Preferably, the communication path uses an inter isolation communication protocol. In a specific implementation, the inter isolation communication protocol is a remote method invocation (RMI) technique. By way of examples, the request may take the form of a command for controlling execution of the target component (e.g., a method request) or a request for information from the target component to monitor execution of the target component. Other examples include requests to change the presentation of the GUI (graphical user interface), to perform calculation of data, send and receive information to and from server machines, etc.

The external program then sends the request to the intermediary component via the established communication path in operation 504. The intermediary component then receives the request in operation 506. The intermediary component then invokes the request on the target component via the target component API in operation 508. In other words, the request from the external program is translated into a request that is acceptable to the API of the target component. In one implementation, an intermediary component is created for each target component within the isolated execution unit and each intermediary component contains translation mechanisms for its particular target component's API type. For example, a first intermediary component is set up for communicating with a first target having an applet type API, and a second intermediary component is set up for communicating with a second target having an Xlet type API. Alternatively, the intermediary component may include translation mechanisms for each type of target component. For example, a single intermediary component includes translation mechanisms for an applet type API and an Xlet type API.

The intermediary component then receives the results of the request from the target component in response to the request in operation 510. The results may be in any suitable form. By way of examples, the results may include information requested by the external program or a response to a request to control the target component's execution. For instance, the result may indicate whether the request was completed or request additional information from the external program that is required for the target component to perform the request from the external program. Of course, the request from the external program may not require any results from the target component. The intermediary component then sends the results of the request to the external program via the established communication path in operation 512. That is, the results may be translated from a format suitable for the target component's API (e.g. applet API) into a format suitable for the established communication path (e.g., RMI).

Figure 6:
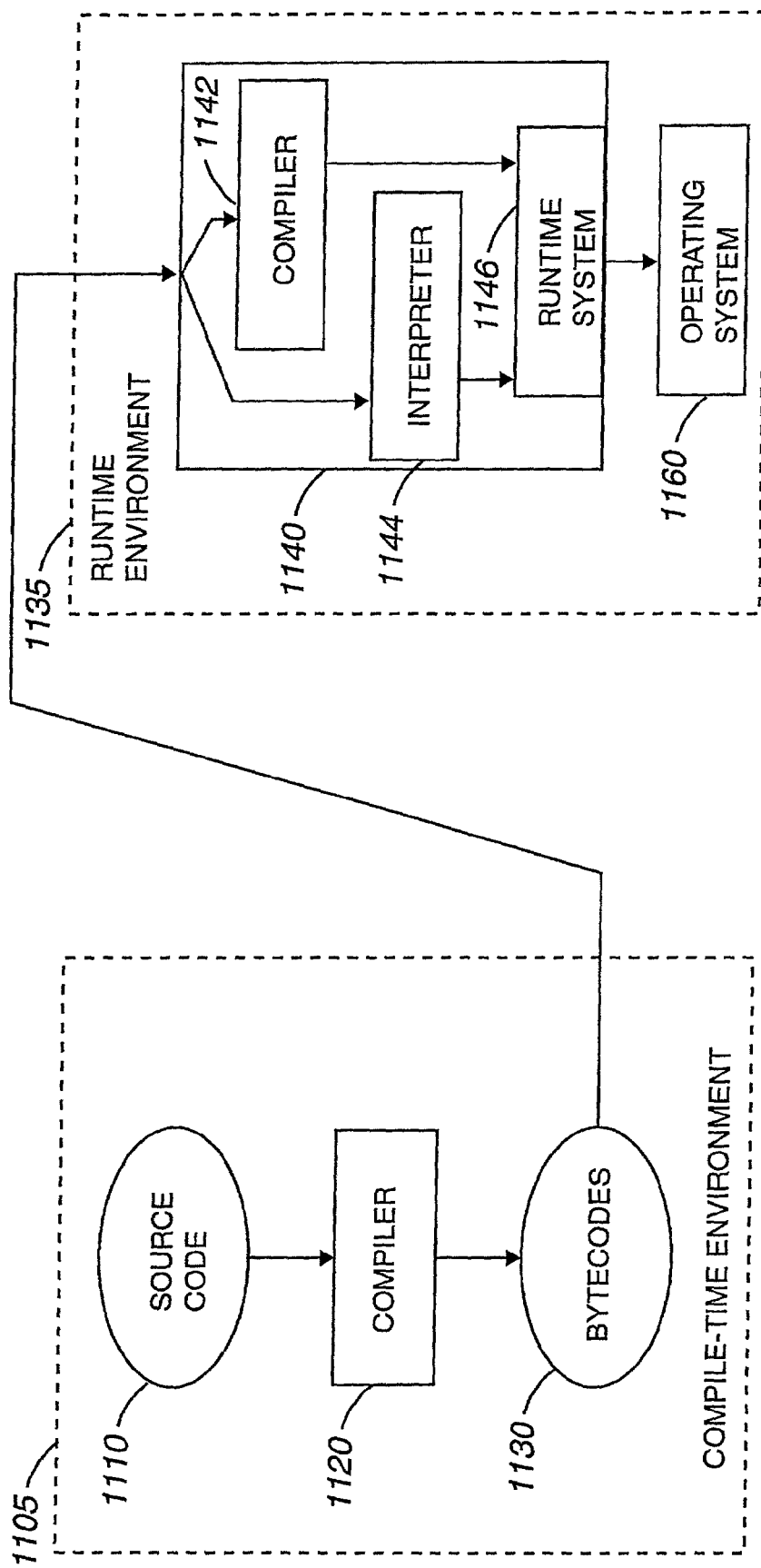
FIG. 6 is a diagrammatic representation of a general-purpose computer system suitable for implementing the present invention.

FIG. 6 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM). The computer system may take any suitable form. For example, the computer system may be integrated with a navigational system or television set top box.

Computer system 1030 or, more specifically, CPUs 1032, may be arranged to support a virtual machine, as will be appreciated by those skilled in the art. One example of a virtual machine that is supported on computer system 1030 will be described below with reference to FIG. 7. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 938 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an Internet network or an intranet network, using a network connection as shown generally at 1012. With such a network connection, it is contemplated that the CPUs 1032 might receive information from the network, or might output information to the network in the course of performing the above-described mechanisms for managing target components. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 7:
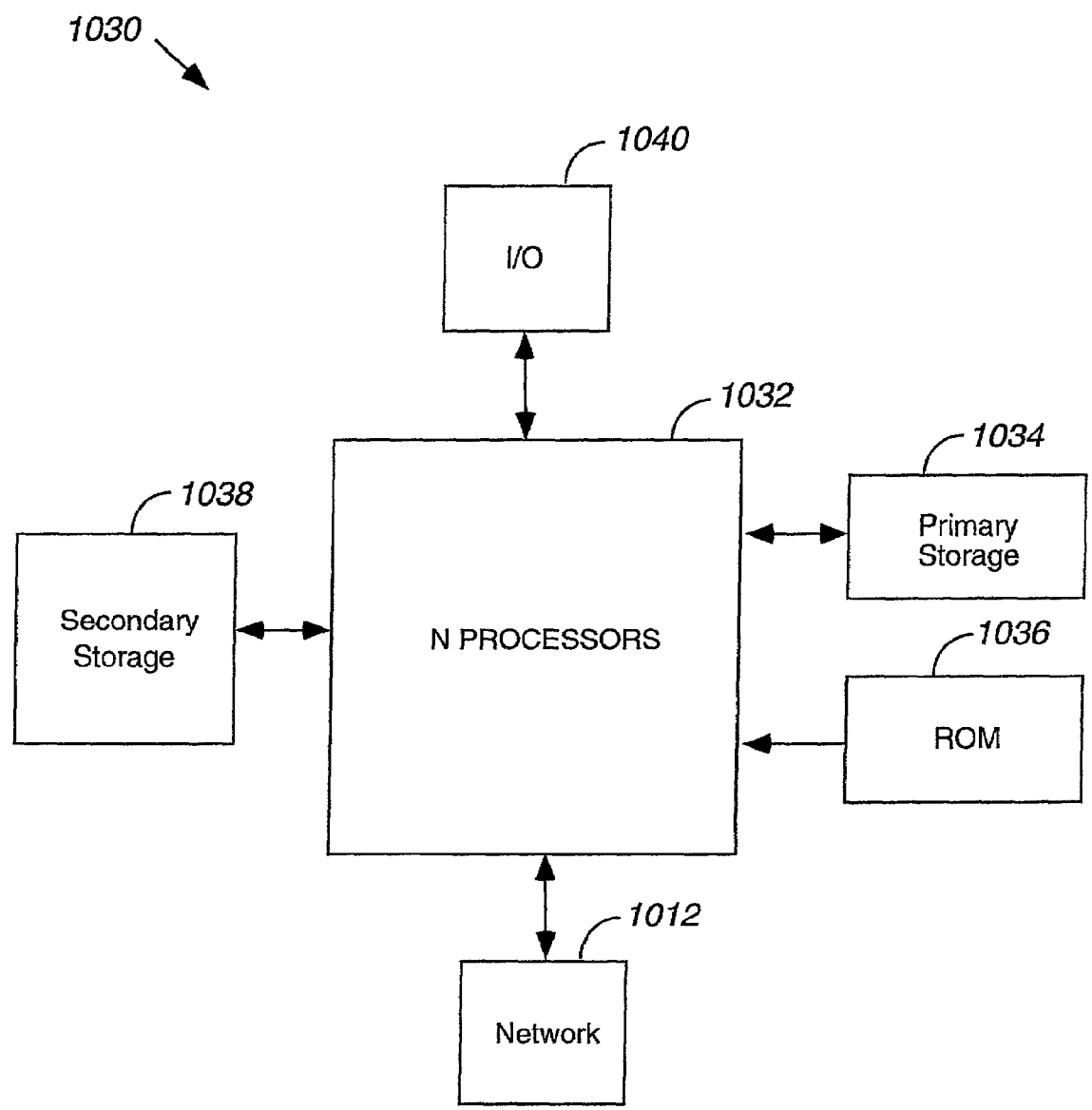
FIG. 7 is a diagrammatic representation of a virtual machine which is supported by computer system of FIG. 6, and is suitable for implementing the present invention.

As previously mentioned, a virtual machine may execute on computer system 1030. FIG. 7 is a diagrammatic representation of a virtual machine which is supported by computer system 1030 of FIG. 6, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 6, or stored on a storage device such as primary storage 1034 of FIG. 6. In the described embodiment, byte codes 1130 are platform independent. That is, byte codes 1130 may be executed on substantially any computer system that is running on a suitable virtual machine 1140.

Byte codes 1130 are provided to a runtime environment 1135 which includes virtual machine 1140. Runtime environment 1135 may generally be executed using a processor or processors such as CPUs 1032 of FIG. 6. Virtual machine 1140 includes a compiler 1142, an interpreter 1144, and a runtime system 1146. Byte codes 1130 may be provided either to compiler 1142 or interpreter 1144.

When byte codes 1130 are provided to compiler 1142, methods contained in byte codes 1130 are compiled into machine instructions. In one embodiment, compiler 1142 is a just-in-time compile which delays the compilation of methods contained in byte codes 1130 until the methods are about to be executed. When byte codes 1130 are provided to interpreter 1144, byte codes 1130 are read into interpreter 1144 one byte code at a time. Interpreter 1144 then performs the operation defined by each byte code as each byte code is read into interpreter 1144. That is, interpreter 1144 "interprets" byte codes 1130, as will be appreciated by those skilled in the art. In general, interpreter 1144 processes byte codes 1130 and performs operations associated with byte codes 1130 substantially continuously.

When a method is invoked by another method, or is invoked from runtime environment 1135, if the method is interpreted, runtime system 1146 may obtain the method from runtime environment 1135 in the form of a sequence of byte codes 1130, which may be directly executed by interpreter 1144. If, on the other hand, the method which is invoked is a compiled method which has not been compiled, runtime system 1146 also obtains the method from runtime environment 1135 in the form of a sequence of byte codes 1130, then may go on to activate compiler 1142. Compiler 1142 then generates machine instructions from byte codes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in The Java™ Virtual Machine Specification by Tim Lindholm and Frank Yellin (ISBN 0-201-63452-X) which is incorporated herein by reference.

Although only a few embodiments of the present invention have been described, it should be understood that the present invention may be embodied in many other specific forms without departing from the spirit or the scope of the present invention. By way of example, the operations involved with managing target components may be reordered. Steps may also be removed or added without departing from the spirit or the scope of the present invention.

Although the techniques for managing target components in accordance with the present invention are particularly suitable for implementation with respect to a Java™ based environment, the techniques may generally be applied in any suitable object-based environment. In particular, the techniques are suitable for use in platform-independent object-based environments. It should be appreciated that the methods may also be implemented in some distributed object-oriented systems. Accordingly, the present embodiments are to be considered as illustrative and not restrictive, and the invention is not to be limited to the details given herein, but may be modified within the scope and equivalents of the appended claims.

What is claimed is:

1. A computer implemented method for an external program to control or monitor a target software component of an isolated execution unit, the method comprising:
    by an external program, creating a new isolated execution unit for execution of the target software component, wherein the external program is outside of the isolated execution unit;
    starting an intermediary software component within the isolated execution unit newly-created by the external program, indicating an identifier of the target software component to the intermediary software component;
    starting the target software component having the indicated identifier within the isolated execution unit newly-created by the external program;
    by the external program indicating one or more parameters representing a desired state for initializing the isolated execution unit;
    by the intermediary software component, initializing the isolated execution unit into the desired state based on the indicated one or more parameters; and
    establishing a communication path between the intermediary software component and the external program, by the external program, controlling or monitoring target software component, executing in the isolated execution unit newly-created by the external program via the established communication path.

2. A computer implemented method as recited in claim 1, wherein the established communication path uses an inter isolation communication protocol.

3. A computer implemented method as recited in claim 2, where the inter isolation communication protocol is a remote method invocation technique.

4. A computer implemented method as recited in claim 1, wherein the communication path is established by the intermediary software component.

5. A computer implemented method as recited in claim 1, further comprising:
   indicating an execution control parameter to the intermediary software component; and
   invoking the indicated execution control parameter on the target software component using an application programming interface (API) of the target software component.

6. A computer implemented method as recited in claim 5, wherein the execution control parameter is a request that has a first format of an inter isolation communication protocol, the method further comprising translating the first format into a second format that is acceptable by the API of the target software component.

7. A computer implemented method as recited in claim 6, wherein the intermediary software component performs the translation.

8. A computer implemented method as recited in claim 5, further comprising:
   receiving a result at the intermediary software component from the target component in response to the invoked execution control parameter; and
   sending the result to the external program.

9. A computer implemented method as recited in claim 8, wherein the intermediary software component sends the result.

10. A computer implemented method as recited in claim 9, wherein the result has a first format that is acceptable by the API of the target software component, the method further comprising translating the first format into a second format that is an inter isolation communication protocol before sending the result to the external program.

11. A computer implemented method as recited in claim 1, wherein the identifier of the target software component is provided by the external program.

12. A computer readable storage medium containing instructions for an external program to control or monitor a target software component of an isolated execution unit, the computer readable medium comprising:
   computer code for creating a new isolated execution unit by an external program for execution of the target software component, wherein the external program is outside of the isolated execution unit;
   computer code for starting an intermediary software component within the execution unit newly-created by the external program and for indicating an identifier of a target software component to the intermediary software component;
   computer code for starting the target software component having the indicated identifier within the isolated execution unit newly-created by the external program;
   computer code for indicating by the external program one or more parameters representing a desired state for initializing the isolated execution unit;
   computer code for initializing by the intermediary software component the isolated execution unit into the desired state based on the indicated one or more parameters; and
   computer code for establishing a communication path between the intermediary software component and the external program, computer code for the external program to control or monitor the target software component, executing in the isolated execution unit newly-created by the external program via the established communication path.

13. A computer readable medium as recited in claim 12, wherein the established communication path uses an inter isolation communication protocol.

14. A computer readable medium as recited in claim 13, where the inter isolation communication protocol is a remote method invocation technique.

15. A computer readable medium as recited in claim 14, wherein the communication path is established by the intermediary software component.

16. A computer readable medium as recited in claim 12, further comprising:
   computer code for indicating an execution control parameter to the intermediary software component; and
   computer code for invoking the indicated execution control parameter on the target software component using an application programming interface (API) of the target software component.

17. A computer readable medium as recited in claim 16, wherein the execution control parameter is a request that has a first format of an inter isolation communication protocol, the computer readable medium further comprising computer code for translating the first format into a second format that is acceptable by the API of the target software component.

18. A computer readable medium as recited in claim 17, wherein the intermediary software component performs the translation.

19. A computer readable medium as recited in claim 16, further comprising:
   computer code for receiving a result at the intermediary software component from the target component in response to the invoked execution control parameter; and
   computer code for sending the result to the external program.

20. A computer readable medium as recited in claim 19, wherein the intermediary software component sends the result.

21. A computer readable medium as recited in claim 20, wherein the result has a first format that is acceptable by the API of the target software component, the computer readable medium further comprising computer code for translating the first format into a second format that is an inter isolation communication protocol before sending the result to the external program.

22. A computer readable medium as recited in claim 12, wherein the identifier of the target software component is provided by the external program.

23. A computer implemented system having at least one processor operable to control or monitor a target software component of an isolated execution unit, comprising:
   an isolated execution unit created by an external program;
   an intermediary software component within the isolated execution unit to initialize the isolated execution unit into a desired state based on one or more parameters indicated by the external program; and
   the external program, outside of the isolated execution unit but in the same computer system as the isolated execution unit created by the external program, the external program being configured to indicate an identifier of a target software component to the intermediary software component, wherein the intermediary software component is configured to start the target software component having the indicated identifier within the isolated execution unit created by the external program and establish a communication path between the intermediary software component and the external program whereby the external program can control or monitor the target software component via the established communication path.

24. A computer implemented system as recited in claim 23, wherein the established communication path uses an inter isolation communication protocol.

25. A computer implemented system as recited in claim 24, where the inter isolation communication protocol is a remote method invocation technique.

26. A computer implemented system as recited in claim 23, wherein the external program is further configured to indicate an execution control parameter to the intermediary software component and the intermediary software component is further configured to invoke the indicated execution control parameter on the target software component using an application programming interface (API) of the target software component.

27. A computer implemented system as recited in claim 26, wherein the execution control parameter is a request has a first format that is an inter isolation communication protocol, the intermediary software component being further configured to translate the first format into a second format that is acceptable by the API of the target software component.

28. A computer implemented system as recited in claim 26, wherein the intermediary software component is further configured to receive a result at the intermediary software component from the target component in response to the invoked execution control parameter and send the result to the external program.

29. A computer implemented system as recited in claim 28, wherein the result has a first format that is acceptable by the API of the target software component, the intermediary software component being further configured to translate the first format into a second format that is an inter isolation communication protocol before sending the result to the external program.

* * * * *